United States Patent [19]
Iwai et al.

[11] Patent Number: 6,036,899
[45] Date of Patent: Mar. 14, 2000

[54] MOLDING DIE AND MOLDING PROCESS FOR SYNTHETIC RESIN MOLDED FOAM

[75] Inventors: Teruo Iwai; Yutaka Hirata, both of Yokohama, Japan

[73] Assignee: Bridgestone Corporation, Tokyo, Japan

[21] Appl. No.: 09/013,203

[22] Filed: Jan. 26, 1998

[30] Foreign Application Priority Data

Jan. 28, 1997 [JP] Japan .................................. 9-028552

[51] Int. Cl.[7] .......................... B29C 44/58; B29C 44/60
[52] U.S. Cl. .......................... 264/51; 425/812; 425/817; 425/4 R; 264/102
[58] Field of Search .................. 425/812, 4 R, 425/817; 264/51, 101, 102

[56] References Cited

U.S. PATENT DOCUMENTS

| | | | |
|---|---|---|---|
| 3,885,618 | 5/1975 | Hodler | 425/812 |
| 3,970,732 | 7/1976 | Slaats et al. | 425/817 R |
| 4,422,840 | 12/1983 | Posch et al. | 425/812 |
| 4,542,887 | 9/1985 | Bethell et al. | 425/812 |
| 4,608,213 | 8/1986 | Kurumizawa et al. | 264/45.1 |
| 4,800,049 | 1/1989 | Gras | 425/817 R |
| 4,973,235 | 11/1990 | Shoji | 425/4 R |
| 4,997,356 | 3/1991 | Katagiri | 249/184 |
| 5,007,815 | 4/1991 | Shoji | 425/817 R |
| 5,039,291 | 8/1991 | Iwasawa et al. | 425/812 |
| 5,098,271 | 3/1992 | Yamagishita | 425/812 |
| 5,451,151 | 9/1995 | Russell | 425/4 R |
| 5,466,404 | 11/1995 | Kiefer | 264/51 |
| 5,626,887 | 5/1997 | Chou et al. | 425/812 |
| 5,723,152 | 3/1998 | Hirata et al. | 425/812 |

*Primary Examiner*—Robert Davis
*Assistant Examiner*—Thukhanh Nguyen
*Attorney, Agent, or Firm*—Sughrue, Mion, Zinn, Macpeak & Seas, PLLC

[57] ABSTRACT

A molding die for efficiently molding a material for a synthetic resin molded foam at a high expansion ratio, a low density, and a high yield with the least occurrence of burrs or flashes. In this molding die, the upper die is mounted on the lower die to form an enclosed cavity therebetween. An opening portion is formed in the upper die, and a cylindrical chamber member with its head closed is air-tightly mounted on the upper die to cover the opening portion. A piston is provided in a chamber in the chamber member such that when a leading end portion of the piston is inserted in the opening portion, a micro-spacing for communicating the cavity to the chamber is formed between the leading end portion of the piston and the opening portion. A piston drive means for vertically moving the piston and for usually setting a leading end surface of the piston at a lower surface of the upper die is provided in the chamber. A pressure adjusting means is provided for evacuating air in the chamber to reduce a pressure in the chamber. In the molding die, when the air in the chamber is evacuated, air in the cavity is also evacuated through the micro-spacing.

8 Claims, 2 Drawing Sheets

MOLDING DIE AND MOLDING PROCESS FOR SYNTHETIC RESIN MOLDED FOAM

BACKGROUND OF THE INVENTION

The present invention relates to a molding die for a synthetic resin molded foam, especially a synthetic resin molded foam having an open cell structure such as a flexible polyurethane molded foam. It also relates to a molding process for a synthetic resin molded foam using the molding die.

Conventionally, there has been proposed in Japanese Utility Model Laid-open No. 58-60418, a process of forming an interior member for a car such as a cushion pad by molding a polyurethane foam molding material while adjusting a pressure in a cavity portion.

The above process is configured in that a cavity for forming a molded product is formed between a lower mold and a core or an intermediate mold. An upper die is mounted to cover the lower die and the core for forming a pressure adjusting chamber (chamber portion) between the core and the upper die and vent holes for communicating the chamber portion to the cavity are formed in the core. Thus, air in the cavity is evacuated to the chamber portion through the vent holes.

In the process disclosed in Japanese Utility Model Laid-open No. 58-60418, since pressure between the cavity and the chamber portion is adjusted only through the vent holes, the sizes of the vent hole must be enlarged and/or the number of the vent holes must be increased, so that the air in the cavity is locally released. This causes problems in that the foaming balance of the foam is lost and considerable labor is required to clean burrs bitten into the vent holes after molding.

Further, in Japanese Patent Publication No. 7-102583, there is disclosed a process of molding a polyurethane foam molding material, comprising the steps of reducing a pressure in a cavity of a molding die, and pouring and foaming a polyurethane foam molding material containing 100 parts by weight of a polyol component and 0.1–0.6 part by weight of water as a foaming component, thereby fluidizing the material and filling the cavity with the material. In this process, the step of reducing a pressure of the cavity of the molding die is performed by evacuating the interior of the cavity through a gap between PL (parting line) surfaces formed when at least two-divided parts of the molding die are closed. More specifically, the interior of the cavity is evacuated through the gap between the PL surfaces by reducing a pressure in a space portion surrounding the PL surfaces of the molding die. As a result, the above process causes a problem that flashes bitten into the gap between the PL surfaces are liable to be formed on the molded foam.

SUMMARY OF THE INVENTION

An object of the present invention is to provide a molding die capable of efficiently molding a material for a synthetic resin molded foam used at a high expansion ratio, a low density, and a high yield with the least occurrence of burrs, and a molding process for molding a material for a synthetic resin molded foam using the molding die.

To achieve the above object, the present invention provides the following molding dies and molding processes for a synthetic resin molded foam.

(1) A molding die for foaming and molding a synthetic resin foamable molding material supplied into a cavity of the molding die, thereby forming a synthetic resin molded foam, comprising:

a die main body having a lower die and an upper die removably mounted on the lower die to cover an opening portion of the lower die thereby forming an enclosed cavity therebetween, said upper die having an opening portion;

a chamber member formed into a cylindrical shape with its head closed, the member being air-tightly mounted on the upper die in such a manner as to cover the opening portion;

a piston provided in a chamber in the chamber member in such a manner that when a leading end portion of the piston is inserted in the opening portion, a micro-spacing for communicating the cavity to the chamber is formed between an outer peripheral wall of the leading end portion of the piston and a wall surface of the opening portion;

a piston drive means for moving the piston in the vertical direction and for usually setting a leading end surface of the piston at a level of a lower surface of the upper die, the piston drive means being provided in the chamber; and a pressure adjusting means for evacuating air in the chamber to reduce a pressure in the chamber;

wherein when the air in the chamber is evacuated, air in the cavity is simultaneously evacuated through the micro-spacing.

(2) A molding die described in (1), wherein the piston drive means has a cylinder with its upper and lower end surfaces closed, the cylinder being fixed on fixing seats mounted on the upper die;

a shaft of the piston is disposed in such a manner as to be movable in the vertical direction while air-tightly passing through the upper and lower end surfaces of the cylinder;

a partitioning plate for partitioning the interior of the cylinder into an upper chamber and a lower chamber is fixed, in the cylinder, on the shaft of the piston in such a manner that an outer peripheral surface of the partitioning plate is in sliding-contact with an inner peripheral wall surface of the cylinder; and air pipes for supplying or discharging air into or from the upper chamber and the lower chamber are connected to an upper side portion and a lower side portion of the cylinder, respectively;

whereby the piston is vertically moved or the leading end surface of the piston is set at the level of the lower surface of the upper die by adjusting air pressures in the upper chamber and the lower chamber.

(3) A molding die described in (1) or (2), wherein the synthetic resin molded foam is a flexible polyurethane molded foam.

(4) A molding process of molding a synthetic resin foamable molding material into a synthetic resin molded foam using the die described in (1) or (2), comprising the steps of:

supplying the synthetic resin foamable molding material in the cavity under atmospheric pressure, and closing the molding die;

evacuating air in the chamber formed in the chamber member by operation of the pressure adjusting means, and also evacuating air in the cavity through the micro-spacing to reduce a pressure in the cavity; and foaming and molding the synthetic resin foamable molding material.

(5) A molding process described in (4), wherein the synthetic resin molded foam is a flexible polyurethane molded foam.

According to the molding die and molding process of the present invention, a molding material for a synthetic resin molded foam is poured in the cavity of the molding die under atmospheric pressure, followed by reducing a pressure in the cavity, and the material is foamed and molded under the reduced pressure. As a result, it is possible to increase a high expansion ratio for the molding material and hence to form a synthetic resin molded foam having a low density by supplying a reduced amount of the material. Furthermore, pressure in the molding die is reduced. Consequently, as compared with the conventional process, a lightweight product can be produced with less occurrence of burrs or flashes. Since the occurrence of burrs or flashes is remarkably decreased or eliminated, it is possible to significantly simplify the finishing step and the repairing step. Even if burrs or flashes are bitten and formed in the spacing between the outer peripheral wall surface of the leading end portion of the piston and the peripheral wall surface of the opening portion, they can be easily cleaned because the opening portion can be opened by moving up or down the piston. Therefore, the present invention can solve the disadvantages of the above-described related art document, Japanese Utility Model Laid-open No. 58-60418, and particularly, the present invention is suitable for forming a molded foam having an open cell structure such as a flexible polyurethane foam.

DETAILED DESCRIPTION OF THE PREFERRED EMBODIMENTS

A molding process for a synthetic resin molded foam according to the present invention is particularly suitable for molding a material for a synthetic resin molded foam having an open cell structure such as a flexible polyurethane molded foam or a closed cell structure. For example it is effective for forming an interior member for a car such as a cushion pad.

Figure 1:
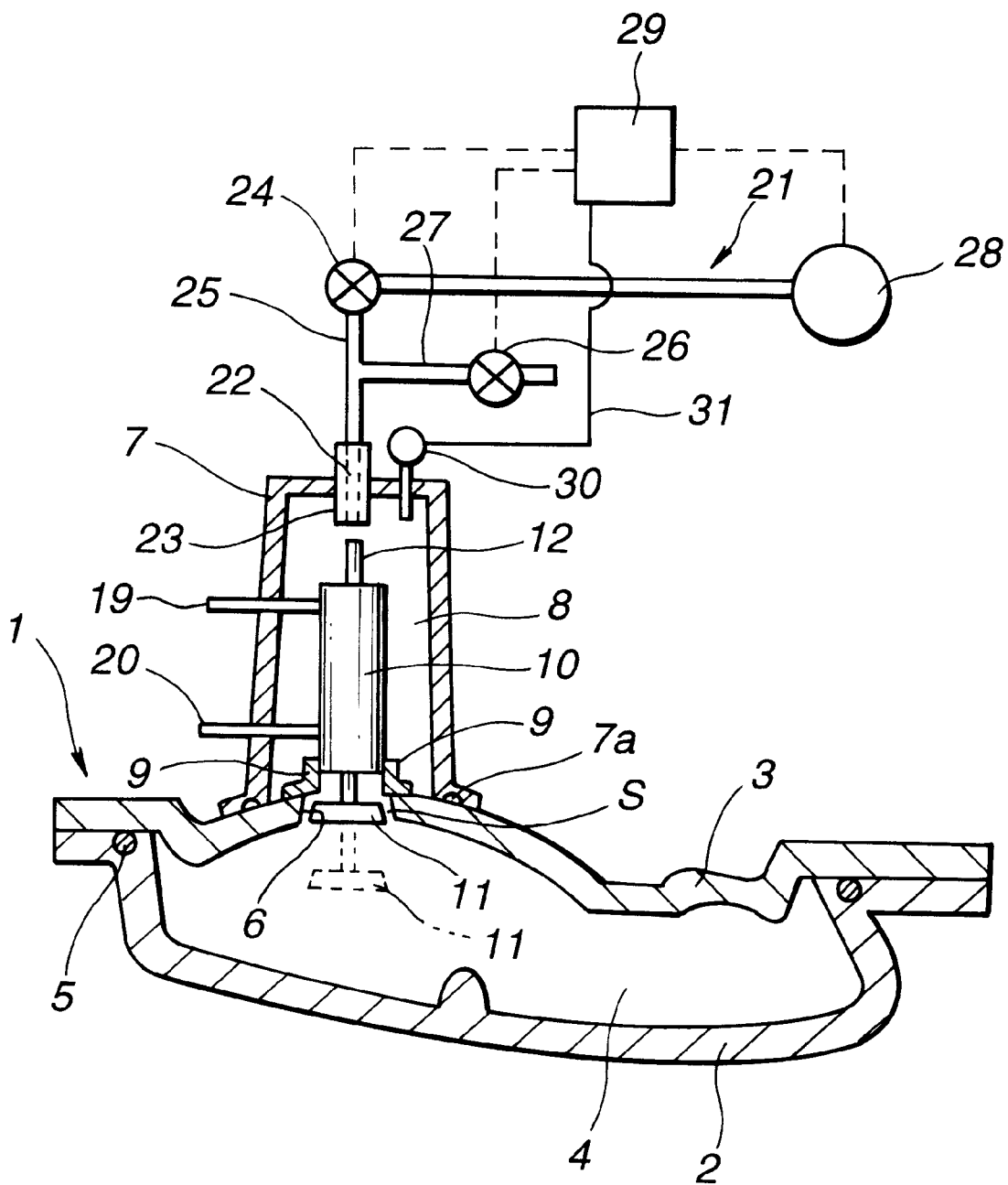
FIG. 1 is a schematic sectional view showing one embodiment of the present invention.

FIG. 1 shows a molding die according to one embodiment of the present invention. Referring to FIG. 1, a molding die 1 includes a recessed lower die 2 and an upper die 3 disposed to cover an upper opening portion of the lower die 2. The lower die 2 and the upper die 3 are removable from each other. It should be noted that the upper die 3 may be fixed on a frame and the lower die 2 may be mounted or dismounted on or from the upper die 3 by a suitable means such as an air bag. When the lower die 2 and the upper die 3 are joined to each other as shown in FIG. 1, a cavity 4 is formed therebetween. Reference numeral 5 indicates a ring-like packing interposed between the lower die 2 and the upper die 3 for maintaining air-tightness of a parting portion between the lower die 2 and the upper die 3.

The upper die 3 has a truncated-cone shaped opening portion 6 with its diameter gradually increased from the a upper end portion to the lower end portion. A chamber member 7 formed into a cylindrical shape with its head closed is mounted on an upper surface of the upper die 3 in such a manner as to cover the above opening portion 6. A ring-like packing 7a is interposed between a lower end surface of the chamber member 7 and the upper surface of the upper die 3 for keeping air-tightness therebetween. The interior of the chamber member 7 defines a chamber 8. Two fixing seats 9 which are L-shaped in cross-section and spaced from each other at a specific distance are fixed, within the chamber 8, on the upper surface of the upper die 3 at an upper edge of the opening portion 6. A cylinder 10 with its upper and lower ends closed is disposed between these seats 9 in such a manner that a lower portion of the cylinder 10 is fixed to the seats 9.

Figure 2:
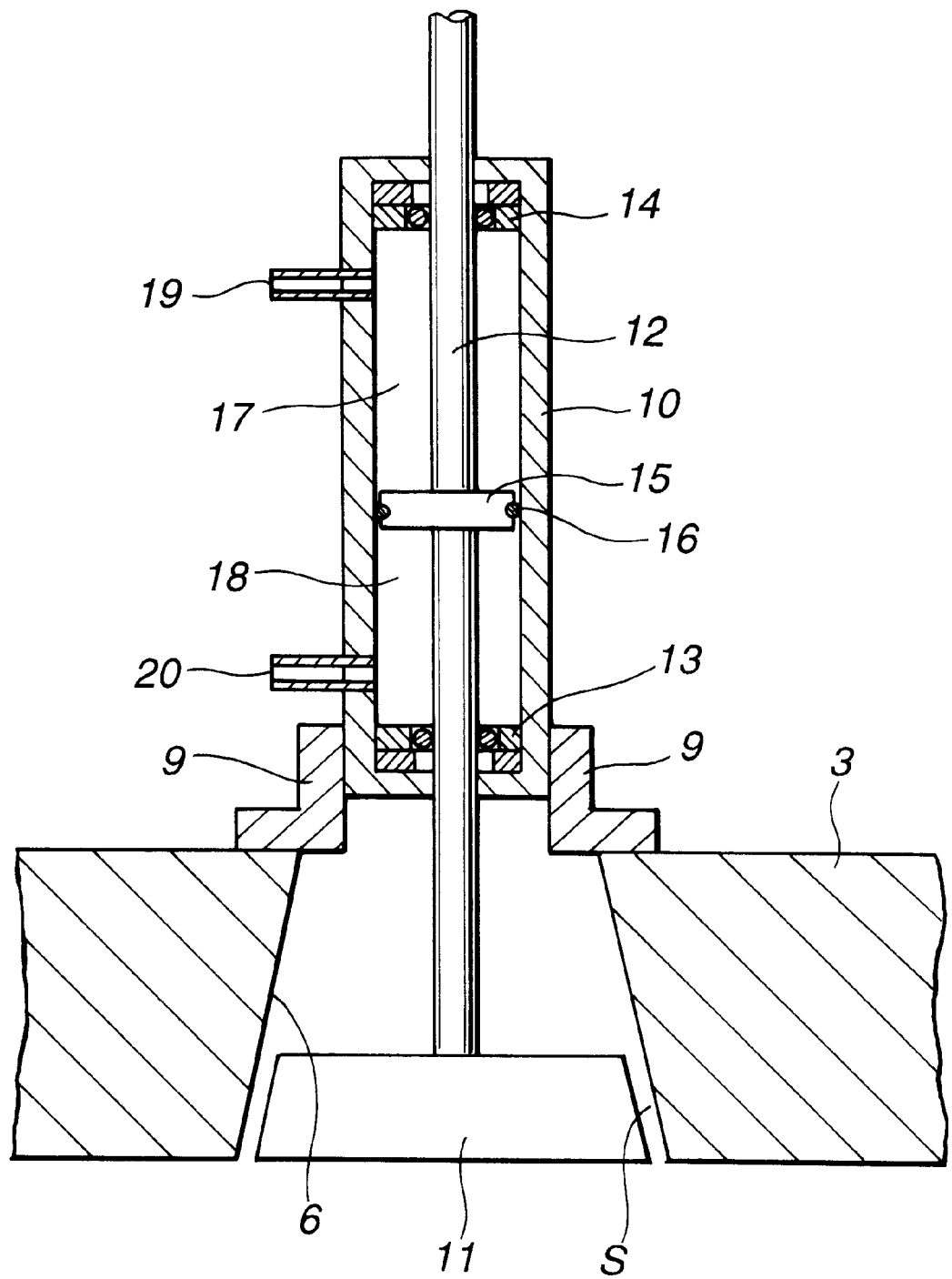
FIG. 2 is an enlarged sectional view showing a chamber member and its neighborhood in the embodiment shown in FIG. 1.

Reference numeral 11 indicates a piston having a piston shaft 12 projecting from a central portion of an upper end surface of the piston 11. The upper end portion of the piston shaft 12, as shown in FIG. 2, air-tightly passes through both the lower end surface and the upper end surface of the cylinder 10 and further it vertically movably projects upward from the upper end surface of the cylinder 10. In FIG. 2, reference numerals 13 and 14 indicate bearings. A ring-like partitioning plate 15 is fixed, within the cylinder 10, on the piston shaft 12. An outer peripheral surface of the partitioning plate 15 is in sliding-contact with an inner peripheral surface of the cylinder 10 through a ring-like packing 16. The partitioning plate 15 air-tightly partitions the interior of the cylinder 10 into an upper chamber 17 and a lower chamber 18. An upper side portion and a lower side portion of the cylinder 10 are connected to ends of air pipes 19 and 20 for supplying or discharging pressurized air into or from the upper chamber 17 and the lower chamber 18, respectively. The other ends of the air pipes 19 and 20 air-tightly pass through the chamber member 7, and are connected to an air supply/discharge unit (not shown) such as an air compressor. The air supply/discharge unit is operated to adjust air pressures in the upper and lower chambers 17 and 18 respectively. This allows the partitioning plate 15 to move in the vertical direction or stop at a specific position. As a result, the piston shaft 12 integrated with the partitioning plate 15 and the piston 11 connected to the leading end portion (lower end portion) of the piston shaft 12 are allowed to move in the vertical direction or stop at specific positions.

The respective air pressures in the upper chamber 17 and the lower chamber 18 are adjusted so that the piston 11 is usually positioned within the opening portion 6 with the leading end surface (lower end surface) of the piston 11 being set at a level of the lower surface of the upper die 3 around the opening portion 6. The piston 11 is formed into a truncated-cone shape similar to that of the opening portion 6. More specifically, the diameter of the truncated-cone shape of the piston 11 is set to be slightly smaller than that of the truncated-cone shape of the opening portion 6 in order to form a micro-spacing S between an outer peripheral wall surface of the piston 11 and a peripheral wall surface of the opening portion 6 in a state in which the piston 11 is inserted in the opening portion 6. With this configuration, the cavity 4 is communicated to the chamber 8 through the micro-spacing S and a gap between both the seats 9. The diameter of a portion of the piston shaft 12 extending downward from the lower end surface of the cylinder 10 is gradually increased toward the lower end portion, and thereby the lower end surface of the piston 11 shown in FIG. 2 is locked so as not to be moved upward from the lower surface of the upper die 3. The piston 11 is moved down by increasing the air pressure in the upper chamber 17 than that of the lower chamber 18, with a result that the opening portion 6 is opened as shown by a chain line in FIG. 1.

Reference numeral 21 indicates a pressure adjusting unit which includes a connecting member 23 having an air communicating hole 22 communicated to the interior of the chamber 8. One-ends of an evacuating pipe 25 and an air intake pipe 27 are connected to the air communicating hole 22 of the connecting member 23. An evacuating valve 24 is interposed in the evacuating pipe 25 and an air intake valve 26 is interposed in the air intake pipe 27. The other end of the evacuating pipe 25 is connected to a vacuum pump 28. Reference numeral 29 indicates a control unit. On the basis of a command supplied from the control unit 29, the air intake valve 26 is closed while the evacuating valve 24 is opened and the vacuum pump 28 is operated to evacuate air in the chamber 8; or the air intake valve 26 is opened while the evacuating valve 24 is closed to allow external air to flow in the chamber 8 through the air intake valve 26. A pressure sensor 30 for detecting a pressure in the chamber 8 is connected to the control unit 29 through a lead wire 31. On the basis of a signal supplied from the pressure sensor 30, the control unit 29 operates the vacuum pump 28 and opens/closes the evacuating valve 24 and the air intake valve 26. Thus, when the air intake valve 26 is closed while the evacuating valve 24 is opened and the vacuum pump 28 is operated on the basis of a command from the control unit 29, air in the chamber 8 is evacuated to reduce a pressure in the chamber 8. Also air in the cavity 4 passes through the micro-spacing S and is evacuated to the exterior through the chamber 8 to reduce a pressure in the cavity 4. When operation of the vacuum pump 28 is stopped and the evacuating valve 24 is closed while the air intake valve 26 is opened, the pressure in the chamber 8 is returned into atmospheric pressure and also the pressure in the cavity 4 is returned to atmospheric pressure through the micro-spacing S.

In the case of forming using the above molding die, a molded product with a shape corresponding to the cavity 4 by molding a flexible polyurethane foam molding material into the cavity 4, the molding material is introduced in the lower die 2 in a state that the upper die 3 mounted with the piston 11 whose lower end surface is set at the level of the lower surface of the upper die 3 is not set on the lower die 2. The upper die 3 is then set on the lower die 2 followed by closing the air intake valve 26 while opening the evacuating valve 24 and operating the vacuum pump 28, so that air in the chamber 8 is evacuated to the exterior to reduce a pressure in the chamber 8. Also air in the cavity 4 is evacuated to the exterior through the micro-spacing S to reduce a pressure in the cavity 4. When the pressure sensor 30 detects that a degree of reduction in pressure in the chamber 8 reaches a predetermined value, operation of the vacuum pump 28 and opening/closing of the evacuating valve 24 and air intake valve-26 are controlled on the basis of a command supplied from the control unit 29 for keeping the degree of reduction in pressure at the specific value. More specifically, when the pressure in the chamber 8 is higher than a setting value, the evacuating valve 24 is opened to evacuate air in the chamber 8, while when it is lower than the setting value, the air intake valve 26 is opened to allow external air to flow in the chamber 8.

The molding material is foamed and molded in the cavity under such a reduced pressure, followed by removal of the upper die 3 from the lower die 2, and a molded product is released from the lower die 2.

After removal of the upper die 3 from the lower die 2 as described above, the piston 11 is moved down as shown by the chain line in FIG. 1 to open the opening portion 6, and burrs bitten into the spacing S are cleaned.

The degree of reduction in pressure in the cavity 4 may be in a range of 10 to 500 mm Hg, preferably, in a range of 100 to 300 mm Hg. The degree of reduction in pressure exerts an effect on a lowering degree of the density of the molded product.

The micro-spacing S may be in a range of 0.05 to 2 mm, preferably, in a range of 0.05 to 0.5 mm, more preferably, in a range of from 0.05 to 0.2 mm. The diameter of the lower end portion of the opening portion may be in a range of 30 to 400 mm, preferably, in a range of 100 to 200 mm. It should be noted that a plurality of opening portions may be provided depending on the volume of a molded product.

EXAMPLE

The present invention will be more clearly understood with reference to the following example:

Example

In this example, molding was performed using the molding die shown in FIGS. 1 and 2. A dry pump (KRX-3SS, produced by Orion Co., Ltd) having a suction ability of 235 L/min was used as the vacuum pump. A high vacuum solenoid valve (working pressure range: $10^{-8}$ Torr-2 kgf/$cm^2$, CKD HVB type) was used as each of the evacuating valve and the air intake valve. A pressure transmitter (KH 25, produced by Nagano Keiki Seisakusho, Ltd.) having a pressure range of $-0.5$ to $0.5$ $kgf/cm^2$ was used as the pressure sensor. The micro-spacing S was set at 0.1 mm and the diameter of the lower end portion of the opening portion 6 was set at 200 mm. The cavity of the molding die was set at 28.7 liters. A polyurethane foam molding material was selected on the basis of a prescription for a generalized HR foam for bag molding (produced by Bridgestone Corporation). This molding material is freely foamed without use of a molding die into a product with a density of 0.035 $g/cm^3$.

First, the molding material of 1300 g was poured in a cavity of a conventional molding die under atmospheric pressure (that is, in the condition with no reduction in pressure), and foamed and molded. As a result, a molded foam having a density of 0.042 $g/cm^3$ was obtained. Any molded foam having a density lower than 0.042 $g/cm^3$ was not obtained. Further, it was observed that the molded foam had many hardened flashes formed by being bitten into a parting portion between the lower die and upper die.

Next, the molding material of 1100 g was foamed and molded using the molding die shown in FIGS. 1 and 2 in a condition that a pressure in the cavity was reduced into 100 mm Hg. As a result, a molded foam having a density of 0.038 $g/cm^3$ was obtained. Further, it was observed that the molded foam had little burrs.

The molding material of 970 g was then foamed and molded using the same molding die under a condition that the pressure in the cavity was reduced into 300 mm Hg. As a result, a molded foam having a density of 0.030 $g/cm^3$ was obtained. Further, it was observed that the molded foam had no burrs.

While the preferred embodiment of the present invention has been described using specific terms, such description is for illustrative purposes only, and it is to be understood that many changes and variations may be made without departing from the spirit or scope of the following claims.

We claim:

1. A molding die for foaming and molding a synthetic resin foamable molding material supplied into a cavity of said molding die, thereby forming a synthetic resin molded foam, comprising:

a die main body having a lower die and an upper die removably mounted on said lower die to cover an opening portion of said lower die thereby forming an enclosed cavity therebetween, said upper die having an opening portion;

a chamber member formed into a cylindrical shape with its head closed, said member being air-tightly mounted on said upper die in such a manner as to cover said opening portion;

a piston provided in a chamber in said chamber member in such a manner that when a leading end portion of said piston is inserted in said opening portion, a micro-spacing of 0.05 to 2 mm opening said cavity to said chamber is formed between an outer peripheral wall of said leading end portion of said piston and a wall surface of said opening portion;

a piston drive means for moving said piston in the vertical direction and for usually setting a leading end surface of said piston at a level of a lower surface of said upper die, said piston drive means being provided in said chamber; and a pressure adjusting means for evacuating air in said chamber to reduce a pressure in said chamber;

wherein when the air in said chamber is evacuated, air in said cavity is simultaneously evacuated through said micro-spacing.

2. A molding die according to claim 1, wherein said piston drive means has a cylinder with its upper and lower end surfaces closed, said cylinder being fixed on fixing seats mounted on said upper die;

a shaft of said piston is disposed in such a manner as to be movable in the vertical direction while air-tightly passing through the upper and lower end surfaces of said cylinder;

a partitioning plate for partitioning the interior of said cylinder into an upper chamber and a lower chamber is fixed, in said cylinder, on said shaft of said piston in such a manner that an outer peripheral surface of said partitioning plate is in sliding-contact with an inner peripheral wall surface of said cylinder; and air pipes for supplying or discharging air into or from said upper chamber and said lower chamber are connected to an upper side portion and a lower side portion of said cylinder, respectively;

whereby said piston is vertically moved or the leading end surface of said piston is set at the level of the lower surface of said upper die by adjusting air pressures in said upper chamber and said lower chamber.

3. A molding die according to claim 1, wherein said synthetic resin molded foam is a flexible polyurethane molded foam.

4. A molding process of molding a synthetic resin foamable molding material into a synthetic resin molded foam using said die according to claim 1, comprising the steps of:

supplying the synthetic resin foamable molding material in said cavity under atmospheric pressure, and closing said molding die;

evacuating air in said chamber formed in said chamber member by operation of said pressure adjusting means, and also evacuating air in said cavity through said micro-spacing to reduce a pressure in said cavity; and foaming and molding said synthetic resin foamable molding material.

5. A molding process according to claim 4, wherein said synthetic resin molded foam is a flexible polyurethane molded foam.

6. A molding die according to claim 2, wherein said synthetic resin molded foam is a flexible polyurethane molded foam.

7. A molding process of molding a synthetic resin foamable molding material into a synthetic resin molded foam using said die according to claim 2, comprising the steps of:

supplying the synthetic resin foamable molding material in said cavity under atmospheric pressure, and closing said molding die;

evacuating air in said chamber formed in said chamber member by operation of said pressure adjusting means, and also evacuating air in said cavity through said micro-spacing to reduce a pressure in said cavity; and foaming and molding said synthetic resin foamable molding material.

8. A molding process according to claim 7 wherein said synthetic resin molded foam is a flexible polyurethane molded foam.

* * * * *